Sept. 18, 1945.  A. H. BRESLOVE  2,385,055
TOOL FOR APPLYING TUBE SEALING DEVICES
Filed Aug. 19, 1943
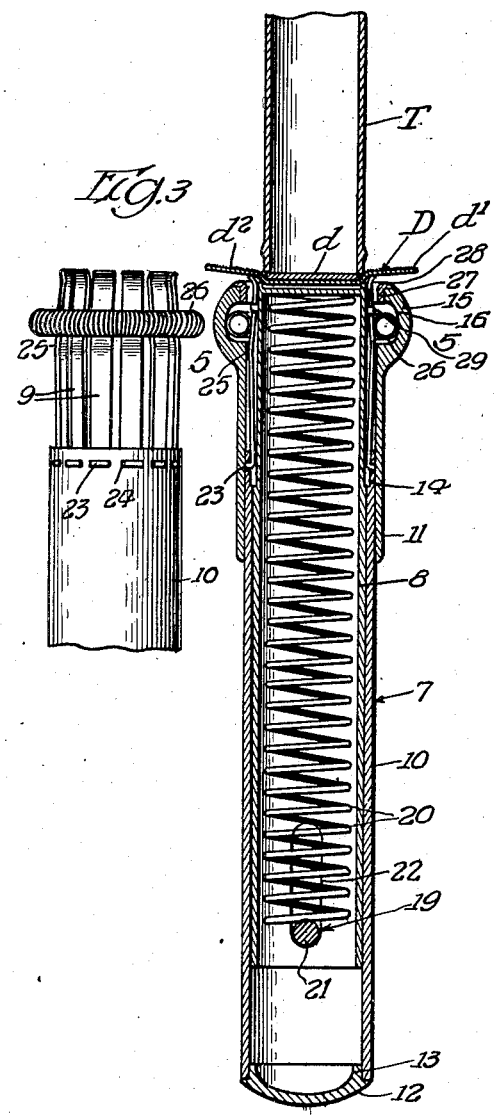
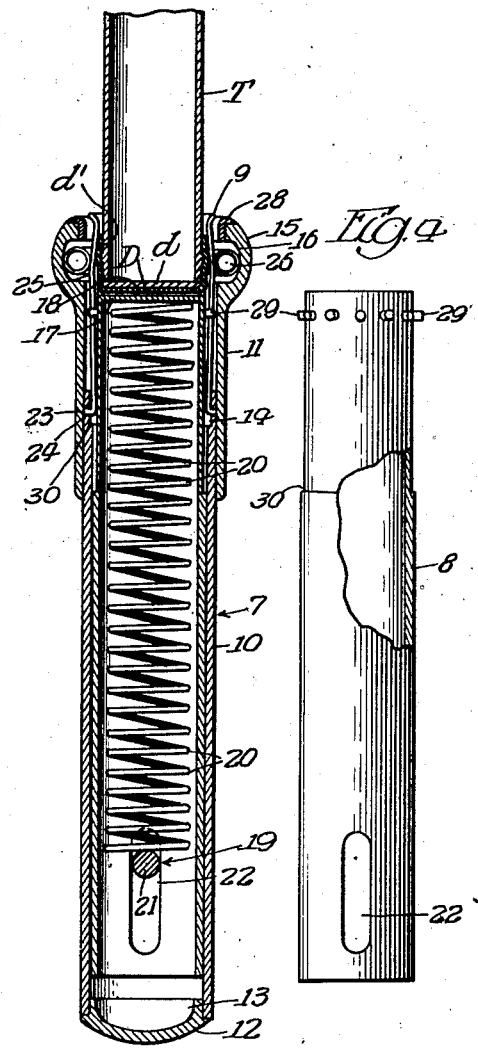
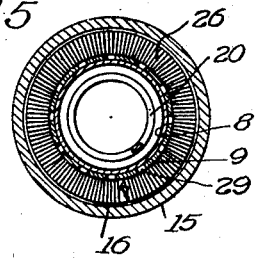
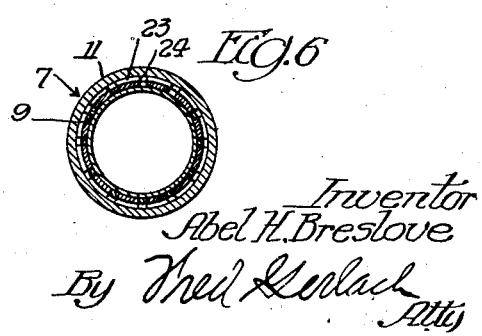
Inventor
Abel H. Breslove
By Fred Gerlach
Atty Patented Sept. 18, 1945

2,385,055

UNITED STATES PATENT OFFICE 2,385,055

TOOL FOR APPLYING TUBE SEALING DEVICES

Abel H. Breslove, Chicago, Ill., assignor, by mesne assignments, to Van Cleef Bros., Chicago, Ill., a partnership consisting of Noah Van Cleef, Felix Van Cleef, Paul Van Cleef, Frances G. Van Cleef, Ruth Van Cleef, and Jeanne Van Cleef Application August 19, 1943, Serial No. 499,182

2 Claims. (Cl. 81—1)

This invention relates to tools for applying sealing devices to the ends of tubes.

It is now common practice in the construction or fabrication of airplanes to employ tubes and to seal the ends of the tubes before installation or coupling of the tubes in order to prevent entry of foreign matter. For tube sealing purposes it is sometimes customary to employ sealing devices of the type that comprises a disc-like pad of fiber or like material and a backing sheet which is materially larger than the pad, has a permanently tacky adhesive coating on one side thereof and the pad adhesively connected to the central portion of the coating, and is adapted, after the pad is placed across the tube end to be sealed, to have its marginal portion folded around the adjacent portion of the tube so that it serves as a temporary medium for holding or securing the pad in place. Sealing devices of this type have heretofore been applied by hand. Hand application of the sealing devices requires a comparatively large amount of time and is not wholly satisfactory because the operator is not likely to apply the sealing devices accurately and uniformly.

The primary object of the present invention is to provide a tool which is expressly designed to apply sealing devices of the aforementioned type and is characterized by simplicity of design, quickness of operation, and accuracy of results.

Another object of the invention is to provide a tool of the type and character under consideration which is highly efficient and as its principal parts comprises (1) a tubular body having one end thereof open to receive the tube end to be sealed; (2) a spring compressed plunger which is slidably mounted in the body, has an end socket adjacent the receiving end of the body for receiving the pad and pad covering central portion of the backing sheet of the sealing device, and is adapted when the tube end is moved into the receiving end of the body or the receiving end of the tube is moved around the tube end after mounting of the sealing device in the socket, to be depressed against the force of its spring into a position wherein it serves to press the pad of the sealing device firmly against the tube end; and (3) an annular series of radially movable fingers which are mounted in, and extend lengthwise of, the receiving end of the body and are adapted when the plunger is depressed in connection with a sealing device applying operation to fold the marginal portion of the backing sheet of the device around the tube end.

A further object of the invention is to provide a tool of the last mentioned character in which the fingers have the inner ends thereof pivotally connected to the body in a simple and novel manner and are urged inwards by way of a circular compression spring in order that they force the marginal portion of the backing sheet of the sealing device into firm adhering relation with the tube end in connection with a sealing device applying operation.

A still further object of the invention is to provide a sealing device applying tool which effectively and efficiently accomplishes its intended purpose and is so designed and constructed that it may be produced at a comparatively low cost.

Other objects of the invention and the various advantages and characteristics of the present sealing device applying tool will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like letters and numerals of reference denote corresponding parts throughout the several views:

Figure 1 is a longitudinal section of a tool embodying the invention;

Figure 2 is a similar section illustrating the manner in which the tool serves to apply a sealing device to a tube end;

Figure 3 is a fragmentary side view showing in detail the design and manner of mounting of the annular series of radially extending fingers in the receiving end of the body of the tool;

Figure 4 is a side view of the plunger of the tool, parts being broken away and other parts being shown in section for purposes of illustration; and Figures 5 and 6 are transverse sections taken respectively on the lines 5—5 and 6—6 of Figure 1.

The tool which is shown in the drawing constitutes the preferred form or embodiment of the invention. It is expressly designed to apply a sealing device D to one end of a tube T, and as its main or principal parts comprises a tubular body 7, a plunger 8, and an annular series of fingers 9. The sealing device D is of standard or conventional design and comprises a disc-like pad $d$ and a flexible backing sheet $d^1$. The pad is formed of fiber or any other slightly compressible sealing material and corresponds in diameter to the external diameter of the end of the tube to be sealed. It is adapted when the sealing device is applied to the tube T by the tool to abut firmly against the adjacent end of the tube. The backing sheet $d^1$ is of materially greater size than the pad and is formed of cloth or any other thin flexible material. It is provided on one side or face thereof with a coating $d^2$ of permanently tacky adhesive and serves temporarily to hold the pad $d$ in its sealing position. The pad fits against the central portion of the adhesive coating and is adhesively connected thereby to the central portion of the adhesive coating on the flexible backing sheet $d^1$.

The body 7 of the tool is composite so far as construction or design is concerned and comprises a pair of sleeves 10 and 11. The sleeve 10 is of uniform external diameter from one end thereof to the other and is closed at one of its ends by a cap 12. The latter embodies an inwardly extending annular flange 13 which fits within the adjacent end of the sleeve 10, and is connected thereto in any suitable manner such, for example, as by a drive fit. The other or open end of the sleeve 10 is provided with a counterbore 14 in order that it is of less thickness than the remainder of the sleeve. Except for the counter-bore the sleeve 10 is of uniform internal diameter. The sleeve 11 is disposed adjacent and longitudinally aligned with the open end of the sleeve 10 and has an internal diameter corresponding to the external diameter of said sleeve 10. The inner end of the sleeve 11 is sleeved over the open or counter-bored end of the sleeve 10 and is connected thereto by a drive or press fit. The outer end of the sleeve 11 is adapted to receive the tube end to be sealed with the device D, as shown in Figure 2. The outer extremity of the sleeve 11 is provided with an external enlargement 15 and this is provided with an internal annular groove 16. The latter is of semicircular cross section, as shown in Figures 1 and 2.

The plunger 8 is in the form of a tube and is slidably mounted in the body 7. It is of slightly less length than the body in order that it is free to slide longitudinally of the body to a limited extent. The end of the plunger that is disposed adjacent the tube receiving end of the sleeve 11 of the body is provided with a crosswall 17. This crosswall is disposed inwards of the outer end portion of the plunger and defines therewith a shallow socket 18 for receiving the pad $d$ and the pad covering central portion of the backing sheet $d^1$ of the sealing device D. A pin and slot connection 19 serves to limit the sliding movement of the plunger relatively to the body 7 and a compression spring 20 operates to urge the plunger outwards, that is, toward the tube receiving end of the sleeve 11 of the body. The pin and slot connection 19 comprises a crosspin 21 and in addition a pair of diametrically opposite, longitudinally extending slots 22 in the inner end of the plunger. The crosspin 21 extends through the two slots 22 and has the ends thereof fixedly mounted in a pair of diametrically opposite holes (not shown) in the cap equipped end of the sleeve 10 of the body 7. As shown in Figures 1 and 2 the pin is located a small distance inwards of the cap 12. The compression spring 22 is of the helical type and is disposed in, and extends lengthwise of, the plunger 8. One end of the spring abuts against the central portion of the crosspin 21 and the other end abuts against the inner face of the crosswall 17 at the outer end of the plunger 8. The spring 20, as previously pointed out, serves to urge the plunger outwards in the direction of the tube receiving end of the sleeve 11 of the body. The pin and slot connection 19 is so arranged that it limits outward movement of the plunger to a point wherein the crosswall 17 is in substantial alignment with the outer end edge of the sleeve 11 of the tool body 7. It is further arranged so that it permits the plunger to be depressed into the body an appreciable distance. In applying the sealing device D to the tube T the device is first positioned so that the pad $d$ and the pad covering central portion of the flexible backing sheet $d^1$ are disposed in the socket 18, as shown in Figures 1 and 2. Thereafter the end of the tube to be sealed is placed against the marginal portion of the pad and either the tube is moved toward the body 7 of the tool or the tool body is moved toward the tube. Longitudinal relative movement of the tube and tool body result in depression of the plunger 8 against the force of the compression spring 20 and causes the margin of the pad $d$ to be brought into firm engagement with the tube end to be sealed. The socket 18 is so proportioned that it serves snugly to receive the pad $d$ and the pad covering central portion of the flexible backing sheet $d^1$.

The fingers 9 serve to fold the marginal portion of the flexible backing sheet $d^1$ around the adjacent end of the tube T during depression of the plunger in connection with a sealing device applying operation. They are disposed in, and extend lengthwise of, the outer end of the sleeve 11 of the body 7. As shown in Figures 3, 5 and 6 the fingers are spaced apart equidistantly. The inner ends of the fingers are disposed in the counter-bore 14 in the open end of the sleeve 10 and have out-turned lugs 23 which fit loosely within circumferentially extending slots 24 in the open or counterbored end of the sleeve 10 and form pivotal connections whereby the fingers are permitted to swing radially, i. e., inwards and outwards, to a limited extent. The outer extremities of the fingers are bent outwards to a slight extent and terminate slightly outwards of the outer end of the sleeve 11 of the tool body 7. The portions of the fingers that are immediately adjacent the inner portion of the annular groove 16 in the enlargement 15 are provided with bends 25 in order that the outer ends of the fingers are disposed inwards of the inner ends. A circular compression spring 26 is disposed in the annular groove 16 and surrounds the outer ends of the fingers. It is located slightly outwards of the bends 25 and serves when the plunger is depressed past the bends in connection with a sealing device applying operation to contract or swing inwards the outer ends of the fingers so that they force the marginal portion of the backing sheet of the sealing device into firm adhering relation with the tube end to be sealed. When the plunger is shifted outwards into its outward position after a sealing device applying operation the outer ends of the fingers when engaged or contacted by the outer end of the plunger are forced or spread outwards against the force of the spring 26. Such spring is formed of a spirally or helically bent wire and is maintained in circular form by connecting the ends of the wire together. It is normally of less diameter than the adjacent peripheral portion of the annular series of fingers in order that it serves to contract the outer ends of the fingers after the plunger is depressed to a point inwards of the bends 25. A ring 27 fits within the outer extremity of the sleeve 11 of the tool body 7 and serves to retain the circular compression spring 26 in the groove 16. This ring is preferably secured in place by a drive fit and has at its outer end an annular outwardly extending flange 28 which abuts against the outer end edge of the sleeve 11. By employing the ring 27 mounting of the spring in the groove 16 in connection with assembly of the tool is facilitated. The outer end of the plunger 8 is provided with an annular series of outwardly extending protuberances 29. The latter correspond in number to, and fit slidably between, the fingers 9 and serve to prevent circumferential displacement of the fingers. When the plunger is depressed in connection with a sealing device applying operation the protuberances 29 slide along the side edges of the fingers. The protuberances do not interfere with inward or outward swinging of the fingers. The outer end of the plunger is provided with an external annular groove 30 in order to provide sufficient room or clearance for the fingers 9. The inner end of this groove terminates adjacent the inner end of the counter-bore 14 in the open end of the sleeve 10.

In using the tool to apply the sealing device D to one end of the tube T the sealing device is mounted in the socket 18 as hereinbefore described. When the device is in place the central portion of the flexible backing sheet $d^1$ fits against the outer face of the crosswall 17 and the pad $d$ is in centered relation with the plunger and the marginal portion of the backing sheet projects outwards, as shown in Figure 1. After positioning of the sealing device the tube end to be sealed is placed against the margin of the pad.

Thereafter the tube T and the body 7 of the tool are moved towards one another either by moving the tube into the receiving end of the sleeve 11 of the tool body or moving the body so that the receiving end of the sleeve 11 is brought into surrounding relation with the tube end to be sealed. During the initial portion of the relative movement of the tube and tool body the plunger, due to the action of the spring, firmly presses the pad against the adjacent end edge of the tube. During further relative movement of the tube and body the plunger is depressed, as shown in Figure 2. During depression of the plunger the outer out-turned extremities of the fingers 9 fold the marginal portion of the flexible backing sheet $d$ of the sealing device around and against the adjacent end of the tube. When the plunger is depressed to a point wherein it is disposed inwards of the bends 25 in the central portion of the fingers the circular compression spring 26 swings the outer ends of the fingers inwards so that they force the marginal portion of the backing sheet of the sealing device into firm relation with the tube end. After application of the sealing device D the tube is withdrawn from the tool or the tool is pulled away from the tube. As soon as the tube and tool are moved apart the compression spring 22 moves the plunger back into its normal position wherein the crosswall 17 is aligned with the outer end edge of the sleeve 11 of the body 7. If the outer margin of the flexible backing sheet $d^1$ of the sealing device D is circular it tends to pucker or form pleats when it is folded around the adjacent end of the tube. If it is desired to flatten the pleats the tool, after full depression of the plunger, is turned in either direction. During turning or rotation of the tool the outer ends of the fingers 9 move around the pleats and flatten them against the adjacent portion of the tube T. In connection with turning of the tool in order to flatten any pleats in the marginal portion of the flexible backing strip of the sealing device the protuberances 29 on the outer end of the plunger prevent the fingers from shifting or moving sidewise.

The herein described sealing device applying tool is extremely efficient in operation and operates when used quickly to apply the sealing device to the tube end to be sealed. It is essentially simple in design and construction and hence may be manufactured at a low cost.

The invention is not to be understood as restricted to the details set forth since these may be modified within the scope of the appended claims without departing from the spirit and scope of the invention.

Having thus described the invention what I claim as new and desire to secure by Letters Patent is:

1. A tool adapted for use in applying to one end of a cylindrical tube a sealing device in the form of a disc-like pad and a materially larger flexible backing sheet having the pad affixed to its central portion, and comprising a tubular body of circular cross section, having one end thereof open and shaped to receive said one end of the tube, and provided inwards of the outer extremity of said one end with an annular series of equidistantly spaced slots, a plunger mounted in the body to slide lengthwise thereof, provided with spring means for urging it towards the receiving end of the body, and adapted when the pad and pad covering portion of the backing sheet of the sealing device are interposed between its outer end and the edge of said one end of the tube and the tube and body are moved towards one another to be depressed against the force of its spring and to press the pad firmly against said edge, an annular series of equidistantly spaced fingers corresponding in number to the slots, positioned in, and extending lengthwise of, the receiving end of the body, provided at the inner ends thereof with outwardly extending lugs fitting loosely in the slots respectively and forming pivotal connections whereby the fingers are permitted to move inwards and outwards to a limited extent, and adapted during depression of the plunger in connection with a sealing device applying operation to have the outer ends thereof fold the marginal portion of the backing sheet around said tube end, and a circular contractile type spring extending around the outer ends of the fingers and serving to urge them inwards in order to cause them to press said marginal portion of the backing sheet firmly around and against said tube end.

2. A tool adapted for use in applying to one end of a cylindrical tube a sealing device in the form of a disc-like pad and a materially larger flexible backing sheet having the pad affixed to its central portion, and comprising a tubular body of circular cross section, having one end thereof open and shaped to receive said one end of the tube and provided inwards of the outer extremity of said one end and with an annular series of equidistantly spaced slots, a cylindrical plunger mounted in the body to slide lengthwise thereof, provided with spring means for urging it towards the receiving end of the body, and adapted when the pad and pad covering portion of the backing sheet of the sealing device are interposed between its outer end and the edge of said one end of the tube and the tube and body are moved towards one another to be depressed against the force of its spring and to press the pad firmly against said edge, an annular series of laterally spaced fingers corresponding in number to the slots, positioned in, and extending lengthwise of, the receiving end of the body, provided at the inner ends thereof with outwardly extending lugs fitting loosely in the slots, respectively, and forming pivotal connections whereby the fingers are permitted to swing inwards and outwards to a limited extent, and adapted during depression of the plunger in connection with a sealing device applying operation to have the outer ends thereof fold the marginal portion of the backing sheet around said tube end, a circular contractile type spring extending around the outer ends of the fingers and serving to urge them inwards in order to cause them to press said marginal portion of said backing sheet firmly around and against said tube end, and an annular series of spaced apart outwardly extending protuberances formed on the outer end of the plunger, fitting slidably between the fingers, and serving to maintain said fingers in laterally spaced relation.

ABEL H. BRESLOVE.